United States Patent [19]

Daniels

[11] 4,212,127
[45] Jul. 15, 1980

[54] POWER PLANE FOR TRANSPORTING FISHING LINE

[76] Inventor: Dennis Daniels, Quilecene, Wash.

[21] Appl. No.: 11,237

[22] Filed: Feb. 12, 1979

[51] Int. Cl.$^2$ ............................................... A01K 97/00
[52] U.S. Cl. ................................... 43/43.12; 43/43.13
[58] Field of Search .................. 43/43.12, 43.13, 42.05

[56] References Cited

U.S. PATENT DOCUMENTS

| | | | |
|---|---|---|---|
| 3,738,047 | 6/1973 | Tozer | 43/43.13 |
| 3,816,954 | 6/1974 | Bissonette | 43/43.12 |
| 3,839,813 | 10/1974 | DeSmidt | 43/43.13 |
| 3,874,110 | 1/1975 | Larson | 43/43.12 |
| 4,065,869 | 1/1978 | Berry | 43/43.12 |
| 4,069,611 | 1/1978 | Dusich | 43/43.12 |

*Primary Examiner*—Nicholas P. Godici
*Attorney, Agent, or Firm*—Seed, Berry, Vernon & Baynham

[57] ABSTRACT

A carrier is movable up and down a heavy downrigger or weight line by a hydrodynamic responsive plane the attitude of which is responsive to the presence or absence of a lightweight fishing line and lure attached to a trailing end of the carrier. Release of the fishing line trips the plane about an axis transverse to the carrier into an upward movement mode.

8 Claims, 3 Drawing Figures

POWER PLANE FOR TRANSPORTING FISHING LINE

BACKGROUND OF THE INVENTION

1. Field of the Invention

This invention pertains to fishing techniques for transporting a fishing line down to considerable depths in a body of water.

2. Description of the Prior Art

In many fishing areas the fish are at great depths such as over 100 feet, making the presentation of the hooked lure to the fish at that depth difficult. Commercial trollers use heavy weight lines (commonly called downriggers), generally of wire with several pounds of lead attached to the end thereof. Baited hooks either with artificial or natural lures are attached to one or more fishing lines and are releasably clipped at one or more depths along the length of the weight line. The weight line is then lowered to the desired fishing depth carrying the lighter weight fishing line and lures with it.

Sports fishermen generally use a weight line similar to the commercial trollers but with less weight and perhaps generally with only a single fishing line attached to each weight line depending upon the sports fishing regulations in that fishing area.

With both commercial and sports fishing the raising and lowering of the weight line each time a fish releases the fishing line from the weight line or a fisherman releases the fishing line to check the condition of the lure is a nuisance and time consuming. If multiple lines are connected to the weight line in the case of a commercial troller, the troller must decide whether to fish with fewer lines until he chooses to raise the weight line or must raise the weight line with its unhooked fishing lines and perhaps lose a catch opportunity in order to reconnect the previously released fishing line.

One attempt to overcome the problem of raising the weight line each time to connect the previously released fishing line is illustrated in U.S. Pat. No. 3,738,047. In this patent a releasable carrier is threaded onto the previously lowered weight line and is provided with a hydrodynamic responsive surface which, due to the trolling or forward movement of the weight line through the water, forces the carrier slidably down the weight line. The difficulty with the apparatus illustrated in this patent and the concept described therein, however, is that the carrier is moved down the weight line but cannot be returned to the surface without raising the weight line. Thus, after one fish is caught, a second carrier is threaded onto the weight line and so on until several carriers may be laying at the bottom of the weight line. Furthermore, the fishing line is released not only by a fish hooking itself on the lure, but is also manually released frequently to check the condition of the lure and clear the lure of seaweed or other debris. Thus, in a single hour of fishing, the fishing line may be released many times and each time a new carrier is added to the weight line to reposition the fishing line at a desired depth. Each time a carrier with its hydrodynamic responsive surface is placed at the lower end of the weight line additional drag is imposed on the line changing its depth and imposing undesirable stresses on the weight line and the winch which holds the weight line. Each of these carriers itself can gather debris or seaweed further increasing the drag. Consequently, the unidirectional carriers shown in this patent have generally not been widely used.

U.S. Pat. No. 3,839,813 discloses a second type of diving plane for carrying a fishing line down a weight line. This diving plane is releasably attached to the weight line so that when a fish is caught or the fishing line is releasably detached from the weight line, the diving plane remains with the fishing line and is pulled into the boat. This technique solves the difficulty of having multiple plane surfaces on the weight line but provides the undesirable disadvantage of a bulky diving plane mechanism remaining with the fishing line. The bulky diving plane mechanism detracts from the enjoyment of playing and landing the fish and can become fouled in the fishing net or objects projecting from the boat hull, such as the propeller and rudder allowing the fish to get free.

SUMMARY OF THE INVENTION

It is an object of this invention to provide a fishing line transporting device which will carry a fishing line down a weight line but will automatically return up the weight line when the fishing line is released from the transporting device.

It is another object of this invention to provide an improved mechanism for rapidly transporting a fishing line to great depths without adding to the weight of the fishing line when a fish is caught.

Basically, these objects are obtained by providing a carrier slidably attached to a weight line or downrigger line which automatically from forward movement of the weight line will carry a fishing line down the weight line and automatically return to the surface by water movement when the fishing line is released from the carrier. The carrier is provided with a pivotally attached hydrodynamic responsive plane which will be triggered into another angular attitude about a pivot axis lateral of the weight line. If desired, the carrier will have sufficient flotation to also raise the carrier when the weight of the fishing line and lure or other terminal tackle is released and the weight line is stationary in the water.

As is readily apparent, the fish line transporting device can carry a fishing line to a great depth, does not interfere with the freedom of fishing when the fish releases the fishing line from the transporting device. Secondly, considerable time is saved as the fishing line transporting device returns automatically to the surface while the fishing line is being returned to the boat. More than one transporting device can be used on a single weight line with the relative downward and upward forces of the individual carriers being adjusted by adjusting the angular attitude of the planes.

DETAILED DESCRIPTION OF THE PREFERRED EMBODIMENTS

Figure 1:
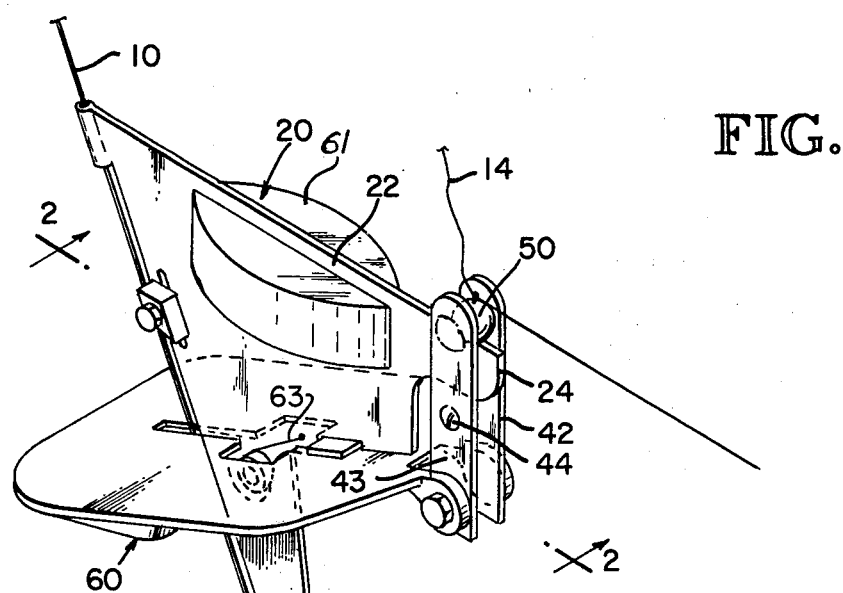
FIG. 1 illustrates a fishing line transporting device embodying the principles of the invention.

A downrigger or heavy wire weight line 10 is attached to a winch on a boat not shown and is provided at its lower end with a heavy weight such as a lead ball 12. As is readily understood, this ball will lower the end of the weight line to whatever desired fishing depth is sought and can weigh several pounds. A lightweight fishing line 14 is provided with a lure 16, either artificial or natural, having suitable hooks 18 for catching a fish. As is readily understood, the lightweight fishing line is attached to a lightweight or other suitable fishing pole on the boat separate from the weight line.

Slidably attached to the weight line is a carrier or fishing line transporting device 20. The carrier includes a rudder 22 terminating in a rearward tab 24. The forward end of the carrier is provided with sleeves 26 which slidably attach to the weight line and if desired can be segmented or detachably split so that the carrier can be completely removed from the weight line for storing. The lower end of the carrier is provided with a journal 30 that holds a pivot pin 32. The pivot pin is mounted for rotation about an axis perpendicular to the rudder 22 and is attached to a hydrodynamic responsive plane or diving plane 34. The diving plane has a lower surface 34a and an upper surface 34b. Depending upon the angular attitude of the plane, the surface 34a will be exposed to the forward motion through the water providing upward force vectors Fu in an up mode or the upper surface 34b will be exposed to the forward motion through the water causing downward force vectors Fd in the down mode angular attitude.

For holding the plane 34 in the down mode the rearward end of the plane is pivotally attached to a spring clip. The spring clip is a U-shaped member having a pair of spaced arms 42 and 43 held together by a screw 44. At the opposite ends of the arms, the arms pinch a bead 50 which is secured to the fishing line 14. The amount of pinching pressure is determined by the adjustment of the screw 44. The bead 50 is thus pressed between the arms 42 and 43 and rests in a notch provided in the upper surface of the tab 24. The angular attitude of the plane 34 in its downward mode is determined by the position of a stop 52 on the lower surface of the rudder 22.

Figure 2:
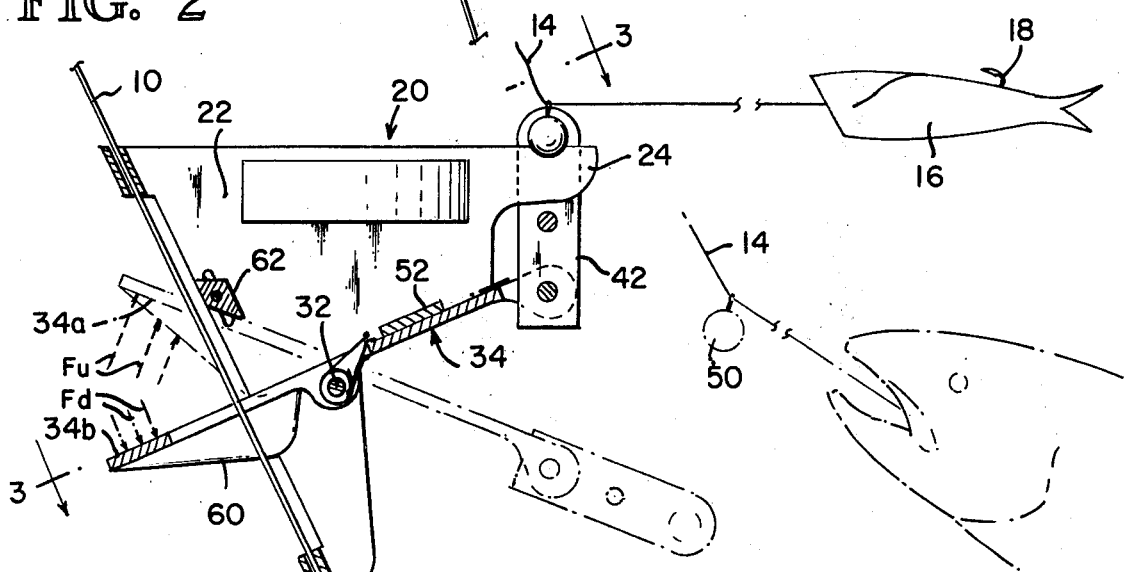
FIG. 2 is a vertical section taken along the line 2—2 of FIG. 1.
Figure 3:
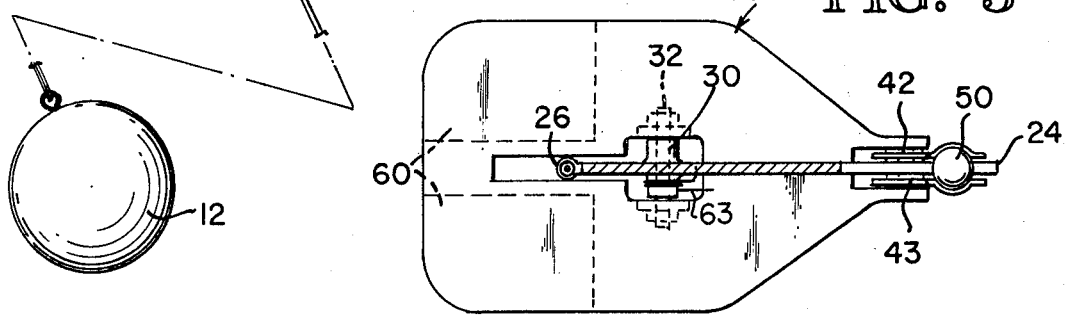
FIG. 3 is a section taken along the line 3—3 of FIG. 2.

When a fish is hooked, it will strike the lure with sufficient force to pull the bead from between the arms 42 and 43 thus allowing the spring clip to fall free into the position shown in phantom lines in FIG. 2. In the preferred embodiment the underside of the plane 34 forward of the pivot pin 32 is provided with a flotation chamber 60 filled with flotation material. This causes the plane to rotate into the phantom line or up mode condition moving the carrier back up the weight line 10. A conventional coil spring 63 as in FIG. 3 also assists in causing the plane to rotate into the up-mode. The force to release the bead can also be provided by manually reeling in the line in the event the fisherman chooses to check the condition of the lure or replace lures. The carrier is also provided with additional flotation 61 on the rudder to cause it to rise in the event forward motion of the boat is stopped and the terminal lure and flashers, if any, are released. The angular attitude adjustment of the plane in the up mode is provided by an adjustable stop 62. Particularly, where multiple carriers are used on a single weight line, it may be desirable to adjust the attitude in the up mode of lower carriers so as to cause them to rise along the weight line but not be of sufficient angular attitude to overcome the downward mode condition of the next uppermost carrier. Thus, if an upper carrier had its fishing line released, it would rise to the surface but if a lower carrier is the only one having its fishing line released, it will move only up until it hits the next uppermost carrier and then must wait until that fishing line is released also.

While the preferred embodiments of the invention have been illustrated and described, it should be understood that variations will be apparent to one skilled in the art without departing from the principles herein. Accordingly, the invention is not to be limited to the specific embodiments illustrated in the drawing.

I claim:

1. Fishing line transporting apparatus for automatically moving a releasable light fish line down a heavily weighted weight line moving through the water and returning to the surface of the water when the light line is released, comprising:

a carrier, means slidably coupling the carrier for movement along the heavily weighted line, means on the carrier for releasably holding a light fish line and lure, a hydrodynamic responsive plane on said carrier for transporting the carrier up and down the weight line depending on its angular attitude as the weight line is moved laterally through the water, means for releasably holding the hydrodynamic responsive plane in a down mode condition with the surface angled to provide a downward force vector on the carrier, and means for changing the angular attitude of the hydrodynamic responsive plane to an up mode condition with the surface angled to provide an upward force vector on the carrier when the fish line is released from the fish line holding means thereby returning the carrier to the water surface to be reused.

2. The apparatus of claim 1, said plane being pivotally mounted on said carrier, said carrier having a rudder for holding the plane pivot axis generally at right angles to the direction of movement of the weight line through the water, said hydrodynamic responsive plane angular attitude changing means including weight means on said plane on one side of said pivot for raising the forward end of the plane into said up mode condition.

3. The apparatus of claim 2, said weight means including lighter-than-water flotation means on said plane forward of said pivot axis.

4. The apparatus of claim 2, said hydrodynamic responsive plane downward mode holding means including clip means having one end pivotally attached to said plane rearward of said plane pivot axis and having a set of pinching arms for holding a bead attached to said fishing line, tab means on said carrier for supporting said bead against movement toward said spring clip means pivotal attachment to hold the plane in said downward movement mode, said bead being releasably held by said pinching arms with a force less than resulting from a fish striking the lure whereby a force equivalent to a hooked fish will pull the bead out of the spring clip means thereby releasing the plane for movement into its upward mode.

5. The apparatus of claim 4, said spring clip means including means for adjusting the pinching force of said pinching arms.

6. The apparatus of claim 2 or 5, said carrier including stop members for locating the angular attitude of the plane in its upward and downward movement modes.

7. The apparatus of claims 1 or 4 including flotation means sufficient to raise said carrier only when forward movement of the carrier is halted and the fish line is released from the carrier.

8. The apparatus of claim 1, said means for changing the angular attitude of the hydrodynamic responsive plane including spring means for assisting in raising the forward end of the plane into said up-mode condition.

* * * * *